United States Patent [19]
Gale

[11] Patent Number: 5,291,556
[45] Date of Patent: Mar. 1, 1994

[54] AUDIO SYSTEM FOR A COMPUTER DISPLAY

[75] Inventor: Stephen Gale, Bristol, England

[73] Assignee: Hewlett-Packard Company, Palo Alto, Calif.

[21] Appl. No.: 573,361

[22] Filed: Aug. 24, 1990

[30] Foreign Application Priority Data

Oct. 28, 1989 [GB] United Kingdom ............... 8924334

[51] Int. Cl.⁵ .............................................. H04S 5/00
[52] U.S. Cl. ...................................... 381/17; 381/24; 348/15; 348/485; 348/552
[58] Field of Search .................... 381/24, 17, 18, 1; 379/53, 54, 202; 358/85

[56] References Cited

U.S. PATENT DOCUMENTS

| | | | |
|---|---|---|---|
| 4,410,761 | 10/1983 | Schickedanz | 381/24 |
| 4,650,929 | 3/1987 | Boerger et al. | 358/85 |
| 4,792,974 | 12/1988 | Chace | 381/1 |
| 4,965,819 | 10/1990 | Kannes | 379/53 |
| 4,995,071 | 2/1991 | Weber et al. | 379/53 |

FOREIGN PATENT DOCUMENTS

| | | |
|---|---|---|
| 0114038 | 9/1979 | Japan ............... 358/85 |
| 63-184443 | 7/1988 | Japan . |
| 1549292 | 7/1979 | United Kingdom . |
| 2118407A | 10/1983 | United Kingdom . |

OTHER PUBLICATIONS

"Multi-Channel Audio Device for Graphics Workstation," IBM Technical Disclosure Bulletin, vol. 30, No. 3, Aug. 1987, pp. 1369-1370.

Primary Examiner—Forester W. Isen

[57] ABSTRACT

An audio system for a computer visual display unit (VDU), providing four loudspeakers 1 to 4 at the corners of the VDU screen. Sound is distributed to the loudspeakers under computer program control, to simulate the emission of sound from an image on the VDU screen.

12 Claims, 1 Drawing Sheet

AUDIO SYSTEM FOR A COMPUTER DISPLAY

FIELD OF THE INVENTION

The invention relates to an audio system for a computer display.

BACKGROUND OF THE INVENTION

A personal computer usually includes a loudspeaker and audio circuitry for generating sounds in conjunction with programs as they are run. Speech or music may be simulated or played from a digital recording. A growing application for computers is in conferencing, where several users may be connected together in a network, each with a terminal. Each screen may contain representations of the users such as icons, photographic representations, or freeze-frame or even real-time video pictures. Each user will generally have a particular region of the screen devoted to him, with the program typically running under a windows environment.

It is found that there is enhancement of a user interface if the sound associated with a window appears to emanate from the position of the window. The invention provides a means of achieving this and in more general terms provides a means of generating sound which is spatially associated with the position of the image of the sound source on the screen. It will be seen that such a facility has application in various types of computer displays including games with moving sound sources and video type displays

SUMMARY OF THE INVENTION

The present invention provides an audio system for a computer visual display unit (VDU), the system comprising a plurality of loudspeakers distributed around the screen of the VDU, audio circuitry for driving the loudspeakers including means to allow a sound source signal to be variably distributed to the loudspeakers.

The screen coordinates of the image provided by a computer program and related to a sound source are processed to provide a control input to the audio circuitry whereby sound is generated which appears to emanate from a position spatially coordinated with the position of the image.

The image position and the apparent sound position may be aligned with respect to their distances from the center of the screen. Alternatively, it may be desirable to exaggerate the apparent position of the sound so that there is not spatial coordination, the position of the sound being further from the center of the screen than the position of the corresponding image. Exaggeration may be provided in one dimension only, for example the "up-down" dimension.

DESCRIPTION OF THE DRAWINGS

The invention will further be described with reference to the accompanying drawing, of which the sole figure is a schematic diagram of an audio system in accordance with the invention.

DETAILED DESCRIPTION OF THE INVENTION

Figure 1:
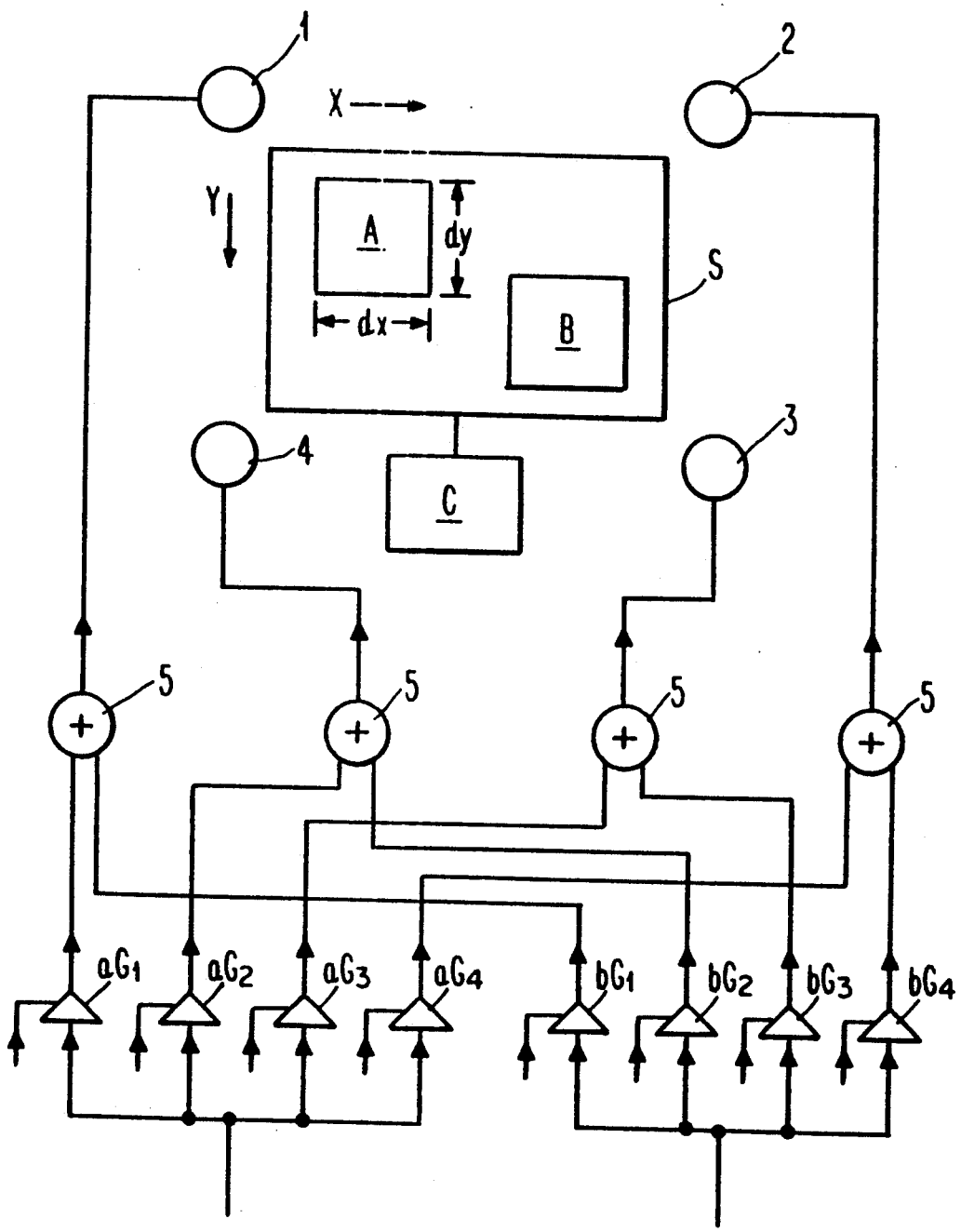

Referring to the drawing there is shown an essentially rectangular screen S of an VDU. Loudspeakers 1 to 4 are situated at the corners of the screen. The computer C associated with the VDU is running a networked conferencing program which operates in a windows environment. Two windows A and B are shown at the top left and bottom right of the screen respectively.

Although any number of loudspeakers may be distributed around the VDU, in preferred embodiments four are placed at respective corners of the screen. Other examples include only three loudspeakers arranged in a triangle and one loudspeaker placed at the middle of each side of the screen.

The system is able to distribute sound between the four loudspeakers to give the impression that sound is emanating from the screen at a position corresponding to the position of the appropriate window. For window A the sound will come predominantly from loudspeaker 1. If the window moves so will the apparent position of the sound source. Any number of windows can be present at once and the sound will be positioned independently for each window. So, for example, the sound associated with window B would come mainly from speaker 3.

This scheme would work equally well for speech, and other complex sounds, as well as for more primitive sounds such as "beeps".

A window is of width dx and height dy. The origin is defined as the upper left hand corner of the screen. The left hand edge of a window is distance x from the origin and the top edge of a window is distance y for each channel. Audio circuitry is provided for each channel A and B, which comprises sets of four variable gain amplifiers aG1 to aG4 and bG1 to bG4 for each window and adding units 5 for each loudspeaker.

The operation of the system may best be understood by the following illustrative example.

In providing sound corresponding to window A the followinq steps are taken:

In Software

1. The center of the window is calculated by the coordinates (x+dx/2), y+dy/2). For example, if the top left hand corner of window A is 50,50 and the width dx, and height dy are 150 and 100 respectively, then the center of the window will be (50+150/2), 50+100/2), or 125, 100.

2. The gain for the amplifiers (aG1, aG2, aG3, aG4) is determined by the sound distribution over the four speakers with reference to the size of the screen.

The distribution of the sound left and right (i.e., between the vertically aligned pairs of speakers 1 and 4, 2 and 3) will be proportional to the ratio:

$$\frac{\text{(width of the screen } - \text{ x coordinate of center of window)}}{\text{width of screen}}$$

for the left side, and $$\frac{\text{(x coordinate of center of window)}}{\text{width of screen}}$$

for the right side.

If for example, the size of the display is the same as VGA screens (768×480), then the width of the screen is 768 and the height 480. If the x coordinate of the center of the window is 125 then the ratio between speakers 1 & 4, and 2 & 3 (i.e. between left and right) is 84% to the left hand speakers and 16% to the right hand speakers.

Similarly, if the y coordinate of the center of the window is 100 and the height of the window is 480, then by the same method the ratio between speakers 1 & 2, and 3 & 4 (i.e. up and down) is 79% is to the upper speakers and 21% to the lower speakers.

Once the percentages of audi directed to the upper and lower speakers and left and right speakers are computed, the percentage of the sound going to each of the four speakers is determined. For example, of the 84% of the sound going to the left hand speakers 79% of this goes to the upper left hand speaker and 21% goes to the lower left hand speaker. Therefore, 66% (79% of 84%) goes to speaker 1 and 18% (21% of 84%) goes to speaker 4.

Using the same method the percentage going to speaker 2 and 3 is 13% (79% of 16%) and 3% (21% of 16%) respectively.

|  |  | left | right |
|---|---|---|---|
|  |  | 84% | 16% |
| up | 79% | 66% | 13% |
| down | 21% | 18% | 3% |

These percentage values can then be used to control the variable gain, aG1, aG2, aG3, and aG4.

In Hardware

The hardware, in preferred embodiments, is in the form of a card for the IBM PC-AT computer class.

1. The incoming audio is split into four and fed into four amplifiers.
2. The variable gains, aG1, aG2, aG3, and aG4, calculated in software control each amplifier.
3. The outputs of the amplifier are added by an adder 5, to the amplifier stages of the other channels.
4. Each adder 5 is coupled to a speaker.

In the figure only two channels are shown, however, a separate set of amplifiers may be provided for each additional channel.

What is claimed is:

1. An audio system for a computer visual display unit having a screen, the system comprising:
    a plurality of loudspeakers distributed around the screen of the visual display unit;
    audio circuitry for driving the loudspeakers with a variably distributed sound source signal related to screen coordinates of an image displayed on the screen; and
    a computer means coupled to the video display unit and the audio circuitry for processing screen coordinates of the image to provide a control input to the audio circuitry whereby sound is generated which appears to emanate from a position having a predetermined relationship with the screen coordinates of the image.

2. The system recited in claim 1 comprising four loudspeakers positioned at respective corners of the screen 3. The system according to claim 1, wherein the sound is generated so as to appear to emanate from a position corresponding to the screen coordinates of the image.

4. The system recited in claim 1, wherein the position of the sound is further from the center of the screen than a position corresponding to the screen coordinates of the image.

5. The system recited in claims 1, 3 or 4, wherein the computer means employs a conferencing program running in a windows environment and the video display unit provides a dedicated screen area for each user of the conferencing program such that one image being associated with one user is displayed for each of the users and audio signals originating with the users are provided to the loudspeakers, the audio signals being spatially distributed among the loudspeakers so that sound indicative of the audio signals appears to emanate from the dedicated screen area associated with the user from which the audio signals have originated.

6. A method of operating a computer visual display unit having a screen and a plurality of loudspeakers distributed around the screen comprising the following steps:
    displaying an image on the screen having known screen coordinates;
    driving the loudspeakers to generate sound, said sound being related to said image; and
    distributing the sound among the loudspeakers so that the sound emanates from the loudspeakers having a predetermined relationship with the coordinates of the image displayed on the screen such that the sound emanating from the loudspeakers corresponds to coordinates further from the center of the screen than the coordinates of the image.

7. A method of operating a computer visual display unit having a screen, a plurality of loudspeakers distributed around the screen and audio circuitry for driving the plurality of loudspeakers, comprising the following steps:
    displaying an image on the screen having known screen coordinates;
    driving the loudspeakers to generate sound; and
    processing the screen coordinates of the image to provide a control input to the audio circuitry whereby sound is generated which appears to emanate from a position having a predetermined relationship with the screen coordinates of the image.

8. The method of claim 7 wherein the sound is distributed in a relationship such that the sound emanating from the loudspeakers corresponds to the coordinates of the image.

9. An audio system for a computer visual display unit having a screen, at least one image being displayed on the screen at known screen coordinates, the system comprising:
    a plurality of loudspeakers distributed around the screen of the video display unit;
    audio circuitry for driving the loudspeakers with a variably distributed sound source signal related to the screen coordinates of each image displayed on the screen; and
    a computer means coupled to the screen and the audio circuitry for processing the screen coordinates of each image displayed on the screen to provide a control input to the audio circuitry so that sound originating with a particular image appears to emanate from a position related to the screen coordinates of the particular image.

10. The system recited in claim 9, wherein the plurality of loudspeakers comprise four loudspeakers positioned at respective corners of the screen.

11. The system recited in claim 9, wherein a position from which the sound appears to emanate is further from the center of the screen than a position corresponding to the screen coordinates of the particular image.

12. The system recited in claim 9, wherein the computer means employs a conferencing program running in a windows environment and each user of the conferencing program has a respective dedicated screen area.

* * * * *